US008738607B2

(12) United States Patent
Dettinger et al.

(10) Patent No.: US 8,738,607 B2
(45) Date of Patent: May 27, 2014

(54) EXTRACTING PORTIONS OF AN ABSTRACT DATABASE FOR PROBLEM DETERMINATION

(75) Inventors: Richard D. Dettinger, Rochester, MN (US); Frederick A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 12/777,706

(22) Filed: May 11, 2010

(65) Prior Publication Data

US 2011/0283112 A1 Nov. 17, 2011

(51) Int. Cl.
*G06F 17/30* (2006.01)

(52) U.S. Cl.
USPC .......................................................... 707/713

(58) Field of Classification Search
None
See application file for complete search history.

(56) References Cited

U.S. PATENT DOCUMENTS

| | | | | |
|---|---|---|---|---|
| 6,671,826 | B1 | 12/2003 | Joshi et al. | |
| 2008/0120286 | A1* | 5/2008 | Dettinger et al. | 707/5 |
| 2010/0138653 | A1* | 6/2010 | Spencer et al. | 713/167 |

OTHER PUBLICATIONS

"FFDC dump output description," http://publib.boulder.ibm.com/infocenter/iseries/v5r4/topic/ddp/rbal1fdodes.htm, pp. 1-7, printed Apr. 9, 2009.

* cited by examiner

*Primary Examiner* — Hung Q Pham
(74) *Attorney, Agent, or Firm* — Patterson & Sheridan LLP

(57) ABSTRACT

Systems, methods and articles of manufacture are disclosed for extracting portions of an abstract database for problem determination. An error may be detected when an application executes an abstract query against the abstract database. A portion of the abstract database may be extracted for problem determination. A defect entry may be created in a defect tracking tool, to store the extracted portion. One or more administrative users may be notified of the defect entry.

21 Claims, 8 Drawing Sheets

500

EXTRACTING PORTIONS OF AN ABSTRACT DATABASE FOR PROBLEM DETERMINATION

BACKGROUND OF THE INVENTION

1. Field of the Invention

Embodiments of the invention relate generally to computer databases and, more particularly, to problem determination for abstract databases.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation.

SUMMARY OF THE INVENTION

One embodiment of the invention provides a method that includes receiving user input specifying a defect tracking tool. Upon detecting an error condition when an application executes an abstract query against an abstract database, the method may also include extracting at least a portion of: (i) the application; (ii) the abstract database; and (iii) a physical database underlying the abstract database, sufficient to recreate the error condition from executing the extracted portions; creating a defect entry representing the error condition and using the specified defect tracking tool; and sending the extracted portions to a user via the specified defect tracking tool.

Another embodiment of the invention provides a computer-readable storage medium containing a program which, when executed, performs an operation. The operation may generally include receiving user input specifying a defect tracking tool. Upon detecting an error condition when an application executes an abstract query against an abstract database, the operation may also include extracting at least a portion of: (i) the application; (ii) the abstract database; and (iii) a physical database underlying the abstract database, sufficient to recreate the error condition from executing the extracted portions; creating a defect entry representing the error condition and using the specified defect tracking tool; and sending the extracted portions to a user via the specified defect tracking tool.

Yet another embodiment of the invention provides a system that includes one or more computer processors and a memory containing a program which, when executed by the one or more computer processors, is configured to perform an operation. The operation may generally include receiving user input specifying a defect tracking tool. Upon detecting an error condition when an application executes an abstract query against an abstract database, the operation may also include extracting at least a portion of: (i) the application; (ii) the abstract database; and (iii) a physical database underlying the abstract database, sufficient to recreate the error condition from executing the extracted portions; creating a defect entry representing the error condition and using the specified defect tracking tool; and sending the extracted portions to a user via the specified defect tracking tool.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
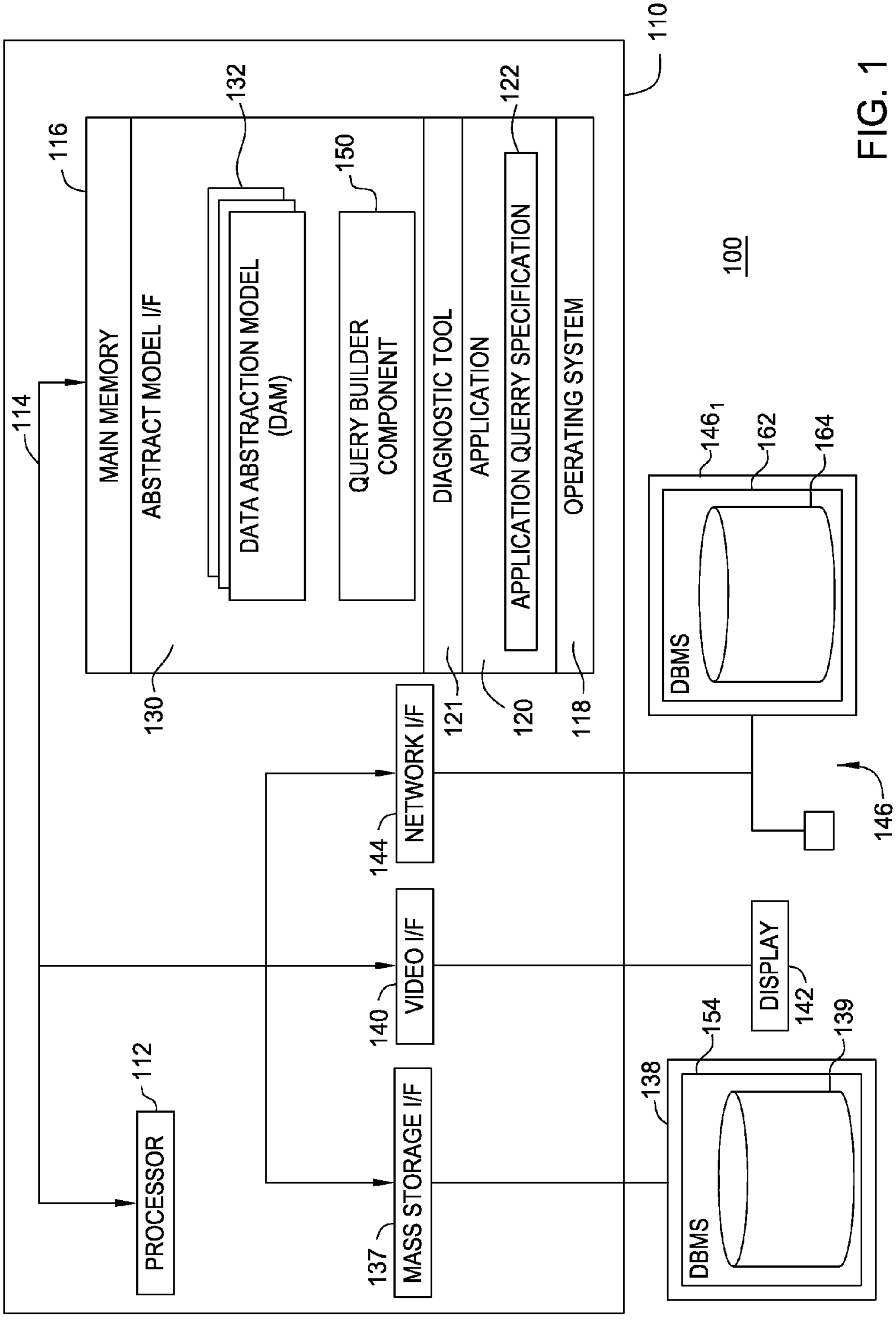
FIG. 1 is a computer system illustratively utilized according to one embodiment of the invention.

Embodiments of the invention provide techniques for extracting portions of an abstract database for problem determination. One embodiment of the invention provides a diagnostic tool. The diagnostic tool may detect an error when an application executes an abstract query against the abstract database. Upon detecting the error, the diagnostic tool may extract a portion of the abstract database for problem determination. For example, the diagnostic tool may extract a portion of: (i) the application; (ii) the abstract database; and (iii) a physical database underlying the abstract database, sufficient to recreate the error from executing the extracted portions. An administrative user (e.g., technical support personnel) may subsequently recreate the error for diagnostic purposes. Advantageously, the administrative user may troubleshoot the error more efficiently to provide a fix for the error in the (original) application. The diagnostic tool may also interface with a defect tracking tool to create a defect entry representing the error. Consequently, users associated with the application, the abstract database, and/or the physical database may more conveniently monitor a status of the defect entry (e.g., to learn whether the fix has been provided).

As described above, the diagnostic tool may detect an error when the application executes the abstract query against the abstract database. In this regard, the present disclosure is directed to managing execution of queries querying physical data logically represented by a data abstraction model. According to one aspect, the abstract database includes a data abstraction model that defines a plurality of logical fields, each having a corresponding logical field specification. Each logical field specification may include a field name and access information for mapping the logical field to one or more physical entities of physical data. Accordingly, a given logical field defines an abstract representation of a specific set of the physical data and the access information can be used to access a field of the physical data which contains the specific set of the physical data.

It should be noted that embodiments of the present invention can be explained below, by way of example, with reference to the data abstraction model described above. However, other embodiments can be implemented using other types of logical models which abstractly describe physical data. Accordingly, the present invention is not limited to a particular data abstraction model, and various different logical models of physical data which abstractly describe the physical data are broadly contemplated.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary Data Processing Environment

Referring now to FIG. 1, a computing environment 100 is shown. In general, the distributed environment 100 includes computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more applications 120, a diagnostic tool 121, and an abstract model interface 130 to a plurality of data abstraction models 132. The applications 120, the diagnostic tool 121, the abstract model interface 130, and the data abstraction models 132 are software products comprising a plurality of instructions that are resident at various times in various memory and storage devices in the computer system 110. When read and executed by one or more processors 112 in the computer system 110, the applications 120, the abstract model interface 130 and the data abstraction models 132 cause the computer system 110 to perform the steps necessary to execute steps or elements embodying the various aspects of the invention.

The applications 120 (and more generally, any requesting entity, including the operating system 118) are configured to issue queries against a database 139. Illustratively, the database 139 is shown as part of a database management system (DBMS) 154 in storage 138. Although only one database is shown for simplicity, the DBMS 154 may include multiple databases. Further, the databases may be distributed relative to one another. Moreover, one or more databases can be distributed to one or more of the networked devices 146. Illustratively, a networked device $146_1$ is shown having a DBMS 162 which includes a database 164. Although only a single database 164 is shown with the DBMS 162, for simplicity, the DBMS 162 may include multiple databases. Further, the databases of the DBMS 162 may be distributed relative to one another. All such different implementations are broadly contemplated.

The databases 139 and 164 are representative of any collection of data regardless of the particular physical representation of the data. A physical representation of data defines an organizational schema of the data. By way of illustration, the databases 139 and 164 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the database 139 includes a data warehouse and the database 164 includes an operational data store. The operational data store includes at least a portion of the physical data contained in the data warehouse. According to one aspect, the data warehouse contains queryable data which is derived from physical data in the operational data store. Accordingly, the queryable data in the data warehouse includes a subset of the physical data in the operational data store. In addition to the subset of data from the operational data store, the data warehouse may include other data.

In one embodiment, the queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") can be composed using logical fields defined by one of a plurality of data abstraction models 132. In one embodiment, each of the data abstraction models 132 defines a multiplicity of logical fields. A logical field defines an abstract view of data whether as an individual data item or a data structure in the form of, for example, a database table. Abstract queries are executed against the database 139 by a query builder component 150 which first transforms the abstract queries into concrete queries having a form consistent with the physical representation of the data contained in the database 139. Operation of the query builder component 150 for transformation of abstract queries into concrete queries and execution of the concrete queries is described below with reference to FIGS. 2-5.

In one embodiment, upon detecting an occurrence of an error when an application executes an abstract query, the diagnostic tool 121 extracts portions of the application, the abstract database, and the physical database underlying the abstract database. The extracted portions may be executed to recreate the error and to facilitate providing a fix for the error. Operation of the diagnostic tool 121 for extracting portions of the application, the abstract database, and the physical database is further described below with reference to FIGS. 6-7.

Logical/Runtime View of Environment

Figure 2:
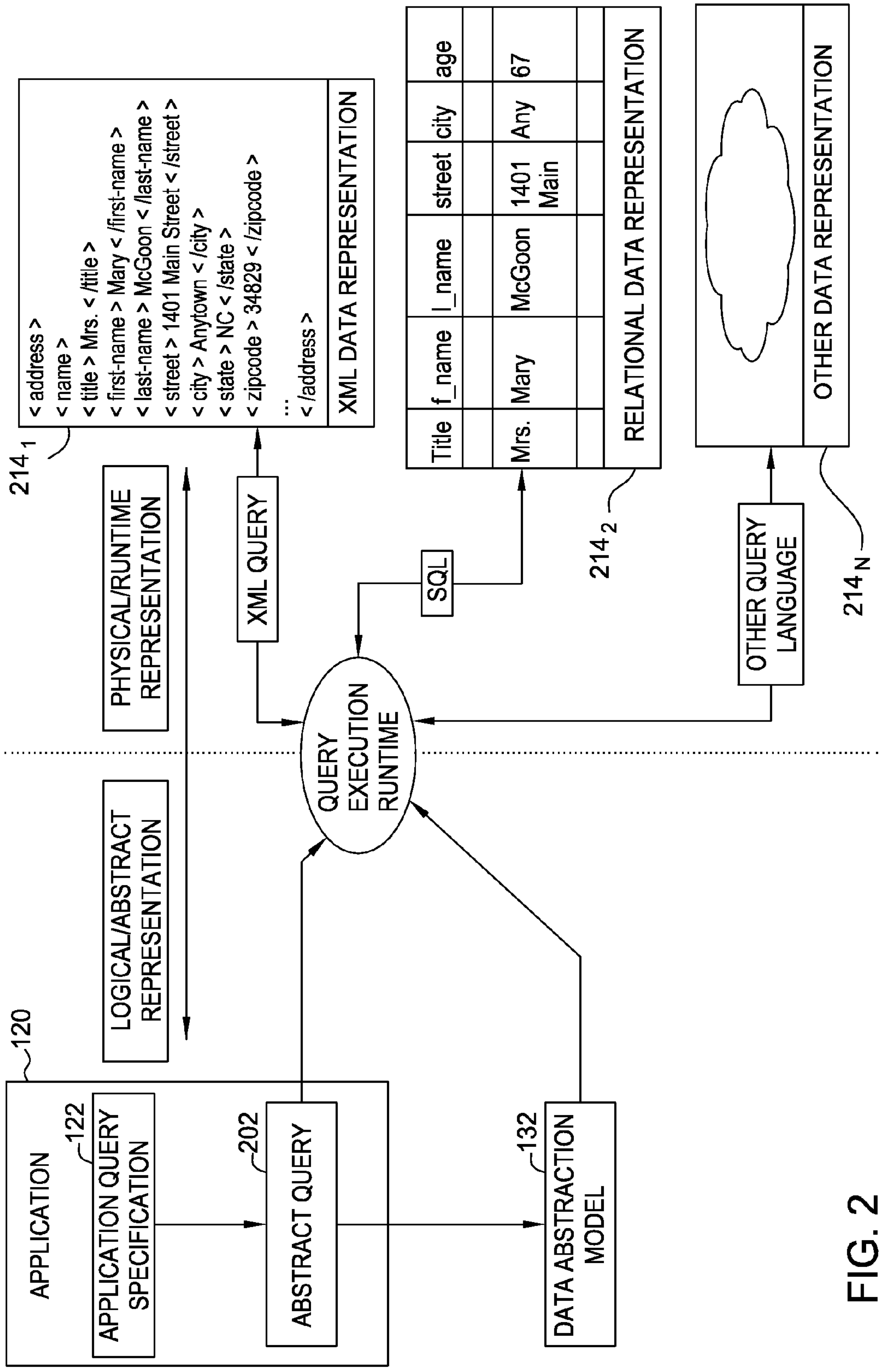
FIGS. 2-3 are relational views of software components, according to one embodiment of the invention.
Figure 3:
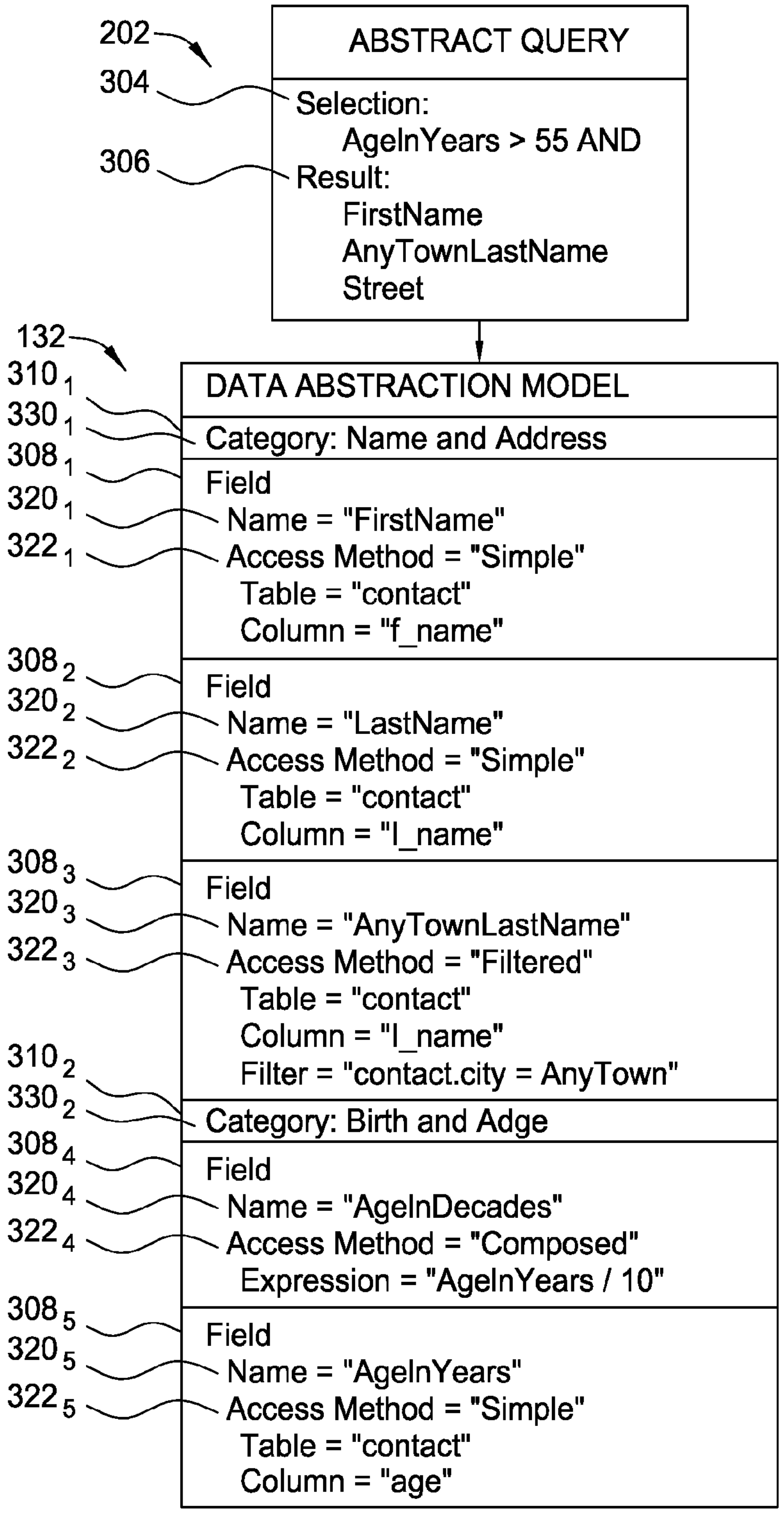

FIGS. 2-3 show an illustrative relational view of the applications 120, the application query specifications 122 and the data abstraction model 132 of FIG. 1 and other components of the invention. A requesting entity (e.g., one of the applications 120) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 122 may include both criteria used for data selection (selection criteria 304) and an explicit specification of the fields to be returned (return data specification 306) based on the selection criteria 304, as illustrated in FIG. 3.

As was noted above, the logical fields specified by the application query specification 122 and used to compose the abstract query 202 are defined by the data abstraction model 132. In general, the data abstraction model 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in a corresponding database (e.g., database 139 of FIG. 1), thereby allowing queries to be formed that are loosely coupled to the underlying data representation.

In one embodiment, illustrated in FIG. 3, the data abstraction model 132 comprises a plurality of field specifications $\mathbf{308}_1$, $\mathbf{308}_2$, $\mathbf{308}_3$, $\mathbf{308}_4$ and $\mathbf{308}_5$ (five shown by way of example), collectively referred to as the field specifications 308 (also referred to hereinafter as "field definitions"). Specifically, a field specification is provided for each logical field available for composition of an abstract query. Each field specification may contain one or more attributes. Illustratively, the field specifications 308 include a logical field name attribute $\mathbf{320}_1$, $\mathbf{320}_2$, $\mathbf{320}_3$, $\mathbf{320}_4$, $\mathbf{320}_5$ (collectively, field name 320) and an associated access method attribute $\mathbf{322}_1$, $\mathbf{322}_2$, $\mathbf{322}_3$, $\mathbf{322}_4$, $\mathbf{322}_5$ (collectively, access methods 322). Each attribute may have a value. For example, logical field name attribute $\mathbf{320}_1$ has the value "FirstName" and access method attribute $\mathbf{322}_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $\mathbf{322}_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 132 includes a plurality of category specifications $\mathbf{310}_1$ and $\mathbf{310}_2$ (two shown by way of example), collectively referred to as the category specifications. In one embodiment, a category specification is provided for each logical grouping of two or more logical fields. For example, logical fields $\mathbf{308}_{1\text{-}3}$ and $\mathbf{308}_{4\text{-}5}$ are part of the category specifications $\mathbf{310}_1$ and $\mathbf{310}_2$, respectively. A category specification is also referred to herein simply as a "category". The categories are distinguished according to a category name, e.g., category names $\mathbf{330}_1$ and $\mathbf{330}_2$ (collectively, category name(s) 330). In the present illustration, the logical fields $\mathbf{308}_{1\text{-}3}$ are part of the "Name and Address" category and logical fields $\mathbf{308}_{4\text{-}5}$ are part of the "Birth and Age" category.

The access methods 322 generally associate (i.e., map) the logical field names to data in the database (e.g., database 139 of FIG. 1). As illustrated in FIG. 2, the access methods associate the logical field names to a particular physical data representation $\mathbf{214}_1$, $\mathbf{214}_2$, . . . $\mathbf{214}_N$ in the database. By way of illustration, two data representations are shown, an XML data representation $\mathbf{214}_1$ and a relational data representation $\mathbf{214}_2$. However, the physical data representation $\mathbf{214}_N$ indicates that any other data representation, known or unknown, is contemplated. In one embodiment, a single data abstraction model 132 contains field specifications (with associated access methods) for two or more physical data representations 214. In an alternative embodiment, a different single data abstraction model 132 is provided for each separate physical data representation 214.

Any number of access methods is contemplated depending upon the number of different types of logical fields to be supported. In one embodiment, access methods for simple fields, filtered fields and composed fields are provided. The field specifications $\mathbf{308}_1$, $\mathbf{308}_2$ and $\mathbf{308}_5$ exemplify simple field access methods $\mathbf{322}_1$, $\mathbf{322}_2$, and $\mathbf{322}_5$, respectively. Simple fields are mapped directly to a particular entity in the underlying physical representation (e.g., a field mapped to a given database table and column). By way of illustration, as described above, the simple field access method $\mathbf{322}_1$ shown in FIG. 3 maps the logical field name $\mathbf{320}_1$ ("FirstName") to a column named "f_name" in a table named "contact". The field specification $\mathbf{308}_3$ exemplifies a filtered field access method $\mathbf{322}_3$. Filtered fields identify an associated physical entity and provide filters used to define a particular subset of items within the physical representation. An example is provided in FIG. 3 in which the filtered field access method $\mathbf{322}_3$ maps the logical field name $\mathbf{320}_3$ ("AnyTownLastName") to a physical entity in a column named "I_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $\mathbf{308}_4$ exemplifies a composed field access method $\mathbf{322}_4$. Composed access methods compute a logical field from one or more physical fields using an expression supplied as part of the access method definition. In this way, information which does not exist in the underlying physical data representation may be computed. In the example illustrated in FIG. 3 the composed field access method $\mathbf{322}_4$ maps the logical field name $\mathbf{320}_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 132 shown in FIG. 3 are representative of logical fields mapped to data represented in the relational data representation $\mathbf{214}_2$ shown in FIG. 2. However, other instances of the data abstraction model 132 map logical fields to other physical representations, such as XML.

An illustrative abstract query corresponding to the abstract query 202 shown in FIG. 3 is shown in Table I below. By way of illustration, the illustrative abstract query is defined using XML. However, any other language may be used to advantage.

TABLE I

ABSTRACT QUERY EXAMPLE

```
001 <?xml version="1.0"?>
002 <!--Query string representation: (AgeInYears > "55"-->
003 <QueryAbstraction>
004   <Selection>
005     <Condition internalID="4">
006     <Condition field="AgeInYears" operator="GT" value="55"
007         internalID="1"/>
008   </Selection>
009   <Results>
```

TABLE I-continued

ABSTRACT QUERY EXAMPLE

```
010         <Field name="FirstName"/>
011         <Field name="AnyTownLastName"/>
012         <Field name="Street"/>
013     </Results>
014 </QueryAbstraction>
```

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 3 is shown in Table II below. By way of illustration, the illustrative Data Abstraction Model is defined using XML. However, any other language may be used to advantage.

TABLE II

DATA ABSTRACTION MODEL EXAMPLE

```
001 <?xml version="1.0"?>
002 <DataAbstraction>
003   <Category name="Name and Address">
004     <Field queryable="Yes" name="FirstName" displayable=
        "Yes">
005       <AccessMethod>
006         <Simple columnName="f_name" tableName="contact">
            </Simple>
007       </AccessMethod>
008     </Field>
009     <Field queryable="Yes" name="LastName" displayable=
        "Yes">
010       <AccessMethod>
011         <Simple columnName="l_name" tableName="contact">
            </Simple>
012       </AccessMethod>
013     </Field>
014     <Field queryable="Yes" name="AnyTownLastName"
        displayable="Yes">
015       <AccessMethod>
016         <Filter columnName="l_name" tableName="contact">
017 </Filter="contact.city=Anytown">
018       </AccessMethod>
019     </Field>
020   </Category>
021   <Category name="Birth and Age">
022     <Field queryable="Yes" name="AgeInDecades" displayable=
        "Yes">
023       <AccessMethod>
024         <Composed columnName="age" tableName="contact">
025     </Composed Expression="columnName/10">
026       </AccessMethod>
027     </Field>
028     <Field queryable="Yes" name="AgeInYears" displayable=
        "Yes">
029       <AccessMethod>
030         <Simple columnName="age" tableName="contact">
            </Simple>
031       </AccessMethod>
032     </Field>
033   </Category>
034 </DataAbstraction>
```

By way of example, note that lines 004-008 correspond to the first field specification 308$_1$ of the DAM 132 shown in FIG. 3 and lines 009-013 correspond to the second field specification 308$_2$.

As was noted above, the abstract query of Table I can be transformed into a concrete query for query execution. An exemplary method for transforming an abstract query into a concrete query is described below with reference to FIGS. 4-5.

Transforming an Abstract Query into a Concrete Query

Figure 4:
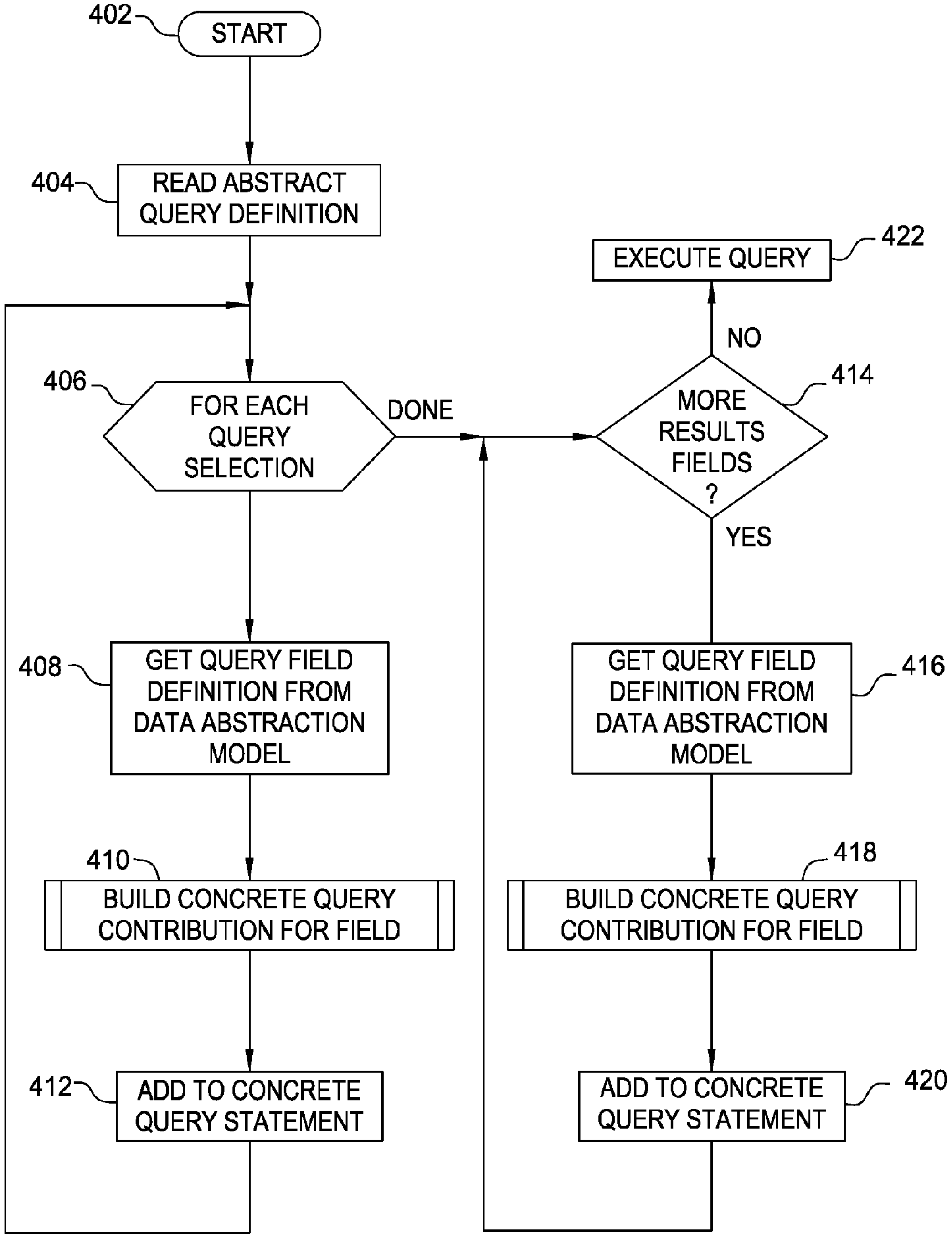
FIGS. 4-5 are flowcharts illustrating the operation of a query builder component, according to one embodiment of the invention.

Referring now to FIG. 4, an illustrative runtime method 400 exemplifying one embodiment of the operation of the query builder component 150 of FIG. 1 is shown. The method 400 is entered at step 402 when the query builder component 150 receives as input an abstract query (such as the abstract query shown in Table I). At step 404, the query builder component 150 reads and parses the abstract query and locates individual selection criteria and desired result fields. At step 406, the query builder component 150 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the query builder component 150 uses the field name from a selection criterion of the abstract query to look up the definition of the field in the data abstraction model 132. As noted above, the field definition includes a definition of the access method used to access the data structure associated with the field. The query builder component 150 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the query builder component 150 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the query builder component 150 looks up a result field name (from the result specification of the abstract query) in the data abstraction model 132 and then retrieves a result field definition from the data abstraction model 132 to identify the physical location of data to be returned for the current logical result field. The query builder component 150 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
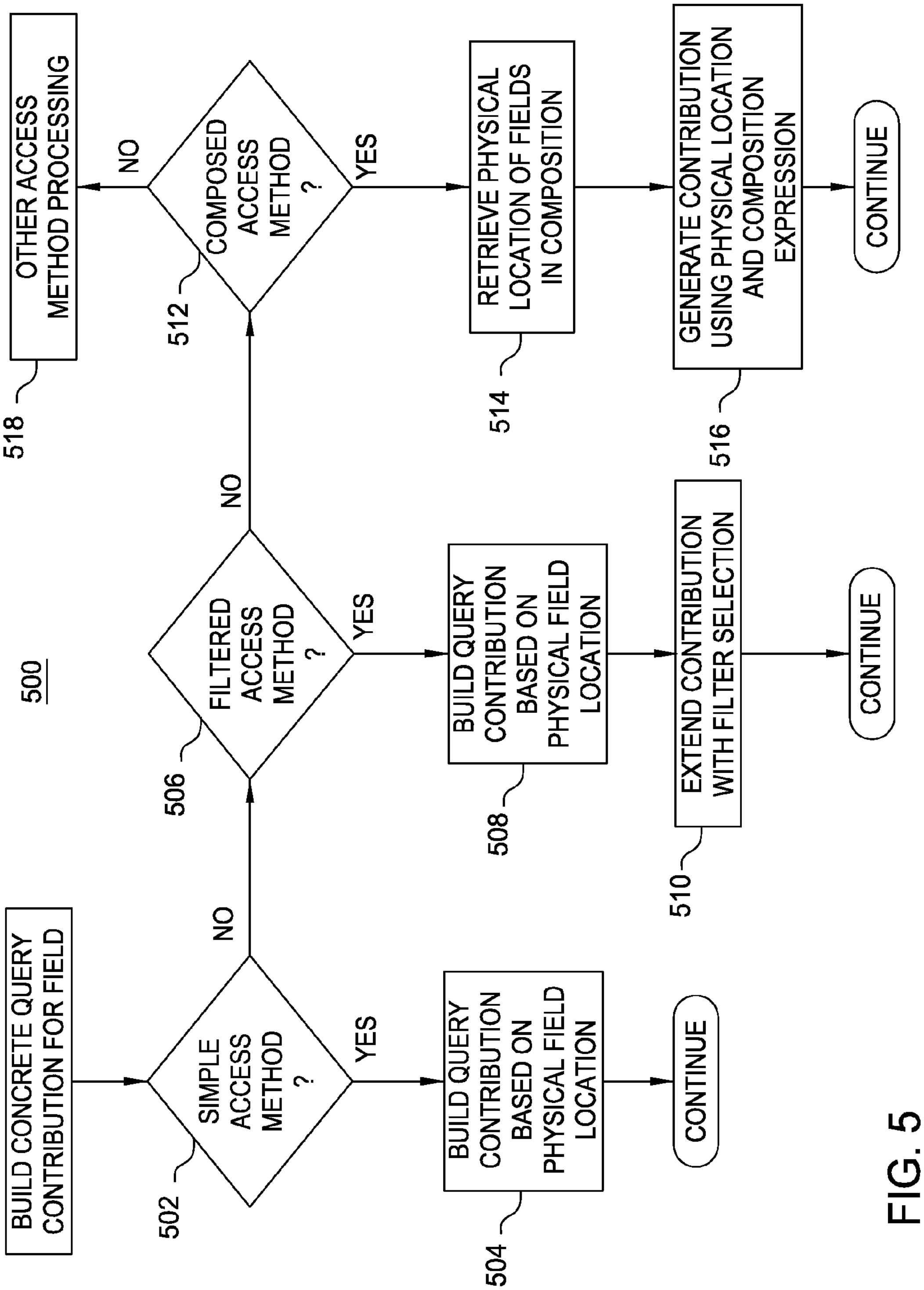

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

Extracting Portions of an Abstract Database

As described above, in one embodiment, the diagnostic tool 121 may detect that an error has occurred during execution of an abstract query against the abstract database by the application for a first user. The diagnostic tool 121 may be configured to detect errors by providing the diagnostic tool 121 with predefined error conditions. Upon detecting an error condition, the diagnostic tool 121 may generate an abstract database application extraction by extracting portions of the application, the abstract database, and the physical database underlying the abstract database, respectively. In an alternative embodiment, the diagnostic tool 121 may extract the entirety of one or more of the application, the abstract database, and the physical database—and extract only a portion of the remainder of the remaining one or more of the application, the abstract database, and the physical database. For example, the diagnostic tool 121 may extract the entire application and portions of the abstract database and the physical database. A second user (e.g., technical support personnel) may subsequently execute the extracted portions to troubleshoot the error condition. Accordingly, the second user may develop a fix for the error condition for the first user. Advantageously, the error in the application for the first user may be diagnosed and rectified more efficiently.

The degree to which the error may be more efficiently diagnosed and rectified may be further illustrated as follows. Table III lists how users of an abstract database in a production environment may be categorized.

TABLE III

CATEGORIES OF USERS OF AN ABSTRACT DATABASE

| Level | Category | Location |
|---|---|---|
| 1 | End user | Client |
| 2 | Database abstraction model (DAM) administrator | Client-IT |
| 3 | Database administrator | Client-IT |
| 4 | DAM technical support | DAM vendor |
| 5 | DAM developer | DAM vendor |

As shown, the users of the abstract database may be categorized into five categories. Each category may uniquely identified by a level. The categories include a Level 1 end user, a Level 2 DAM administrator, a Level 3 database administrator, a Level 4 DAM technical support, and a Level 5 DAM developer. Assume that a DAM vendor provides the DAM to a client, such as a business. The end user, the DAM administrator, and the database administrator may be employees of the business. Further, the DAM administrator and the database administrator may typically work in the information technology (IT) department of the business. On the other hand, the DAM technical support and the DAM developer may be employees of the DAM vendor.

More specifically, the end user may be a person at a site of the client who builds and runs abstract queries using one or more user interfaces and/or applications for the DAM. The DAM administrator may be a person at the client site who performs logical modeling to create and configure DAMs. The database administrator may be a person at the client site who creates and maintains one or more physical databases underlying the DAM. The DAM technical support may be a person at a site of the DAM vendor that handles support requests (e.g., telephone calls, emails, etc.) from clients, for the DAM. The DAM developer may be a person at the DAM vendor site who is responsible for performing development work on the DAM, fixing bugs in the DAM, and assisting the DAM technical support.

In one embodiment, any error—that occurs when the application executes the abstract query against the abstract database—may fall into one of the categories of Table III. The higher the level associated with the category, the more costly it may be for the client and/or the DAM vendor to solve the error. Table IV lists examples of errors involving each category of user.

TABLE IV

EXAMPLES OF ERRORS INVOLVING EACH CATEGORY OF USER

| Level | Error |
|---|---|
| 1 | End user is not properly using a supported DAM configuration |
| 2 | DAM administrator has incorrectly configured the DAM |
| 2/3 | DAM administrator and/or database administrator have introduced an error in the interfaces between the DAM and the physical database |
| 3 | Database administrator has not fixed an error in the physical database |
| 4 | DAM administrator requires assistance from DAM technical support to diagnose an error |
| 5 | DAM developer is required to diagnose, fix, test, and ship a solution for a bug in the DAM |

When the end user encounters an error with an abstract query, it may be time-consuming and/or costly to troubleshoot the error through the various levels of users. Further, a client often does not have a suitable infrastructure and/or processes to transition from an error encountered by the end user (Level 1) to the IT department of the client (Levels 2 and 3) and to the DAM vendor (Levels 4 and 5). Advantageously, using the techniques described herein, the client and/or the DAM vendor may more seamlessly and efficiently troubleshoot an error through the various levels of users and provide a diagnosis and/or fix.

In one embodiment, the diagnostic tool 121 extracts portions of the application 120, the abstract database, and the physical database. The diagnostic tool 121 may send the extracted portions to another user (e.g., a Level 2 user) via a defect tracking system. The other user may execute the extracted portions in a test environment to recreate and analyze the error. The other user may also send the extracted portions to yet another user (e.g., a Level 3 user) to be involved in troubleshooting the error.

Figure 6:
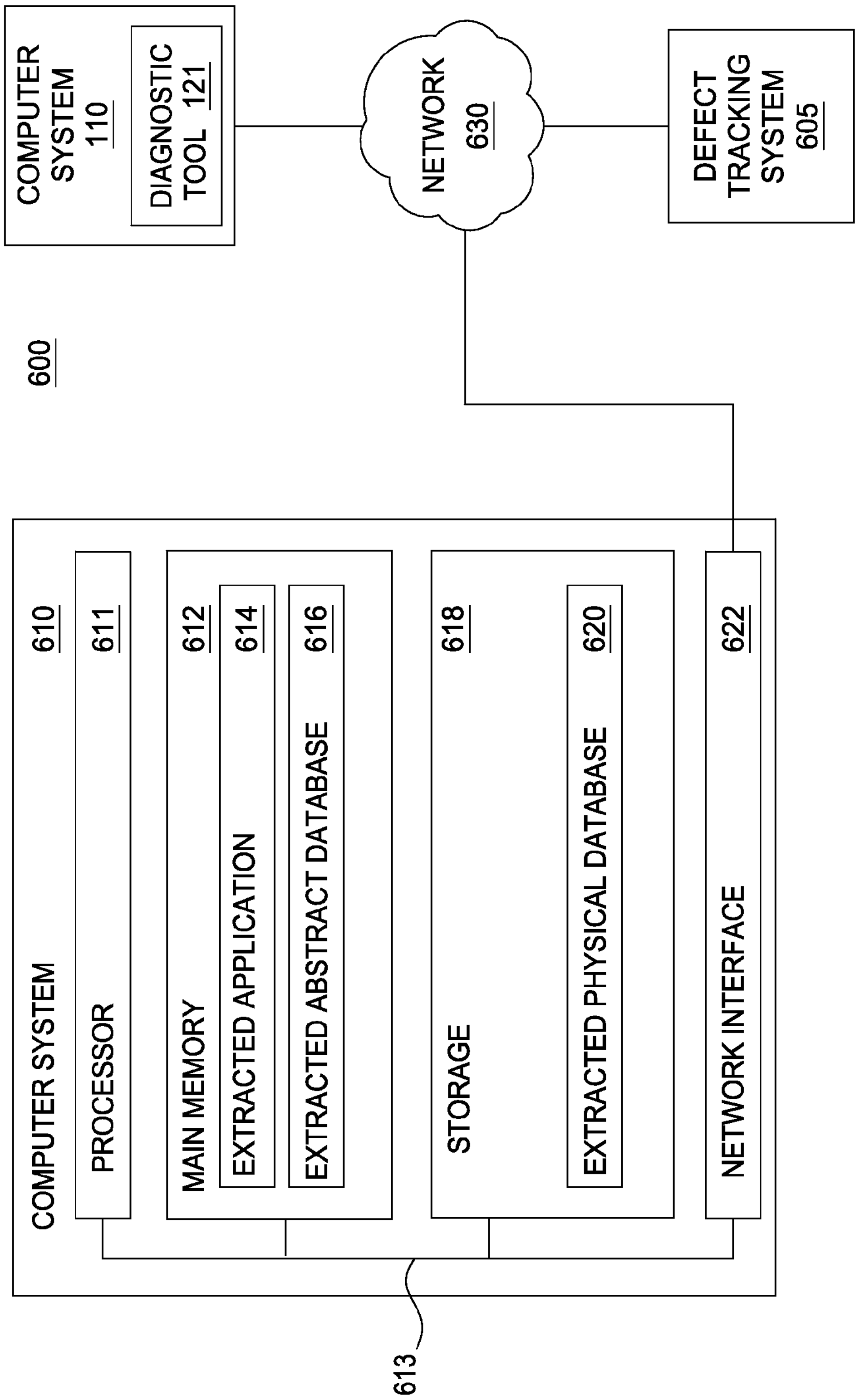
FIG. 6 shows portions of an abstract database as extracted by a diagnostic tool, according to one embodiment of the invention.

FIG. 6 shows the portions extracted by the diagnostic tool 121, according to one embodiment of the invention. Specifically, the diagnostic tool 121 may send an extracted application 614, an extracted abstract database 616, and an extracted physical database 620 to another computer system 610 via the defect tracking system 605. The computer system 110, the defect tracking system 605, the computer system 610, and/or other computers may be connected via a network 630. In general, the network 630 may be a telecommunications network and/or a wide area network (WAN). In a particular embodiment, the network 630 is the Internet.

The computer system 610 generally includes a processor 611 connected via a bus 613 to a main memory 612, a network interface device 622, and a storage 618. The processor 611 may also be connected via the bus 613 to one or more input devices and/or output devices. The computer system 610 is generally under the control of an operating system. The processor 611 is included to be representative of a single CPU, multiple CPUs, a single CPU having multiple processing cores, and the like. Similarly, the main memory 612 may be a random access memory. While the main memory 612 is shown as a single identity, it should be understood that the main memory 612 may comprise a plurality of modules, and that the main memory 612 may exist at multiple levels, from high speed registers and caches to lower speed but larger DRAM chips. The network interface device 622 may be any type of network communications device allowing the computer system 610 to communicate with other computers via the network 630.

The storage 618 may be a hard disk drive storage device. Although the storage 618 is shown as a single unit, the storage 618 may be a combination of fixed and/or removable storage devices, such as fixed disc drives, floppy disc drives, tape drives, removable memory cards, or optical storage. The main memory 612 and the storage 618 may be part of one virtual address space spanning multiple primary and secondary storage devices.

As shown, the main memory 612 includes the extracted application 614 and the extracted abstract database 616. The storage 618 includes the extracted physical database 620. In one embodiment, the other user receiving the extracted portions may execute the extracted portions in a test environment on the computer system 610, to recreate the error encountered by the end user on the computer system 110. Accordingly, the other user may diagnose and/or provide a fix for the error encountered by the end user.

In one embodiment, a Level 2 DAM administrator may configure the diagnostic tool 121 with information for accessing a defect tracking system 605. The information may include a uniform resource indicator (URI) of the defect tracking system 605, a username, a password, etc. The Level 2 DAM administrator may also provide the diagnostic tool 121 with a password for encrypting sensitive information sent via the defect tracking system 605. The diagnostic tool 121 may access the defect tracking system 605 using a parameterized URI to create a new defect entry in the defect tracking system 605. For example, the diagnostic tool 121 may access a URI http://defects.organization.tld/create.jsp/ and pass associated parameters (e.g., using a HTTP GET request). The parameters may represent a title for a defect, a description of the defect, a user who is designated as an owner of the defect, one or more users who should be notified of any updates in handling the defect, and/or attached files that are associated with the defect. In response, the defect tracking system 605 may create a new defect entry and send an identifier of the new defect entry (and/or a URI for accessing the new defect entry) to the diagnostic tool 121.

In one embodiment, the diagnostic tool 121 may also be configured to detect one or more error conditions associated with executing an abstract query. For example, a user may provide definitions of error conditions to the diagnostic tool 121. The diagnostic tool 121 may then detect error conditions based on the definitions. Table V lists examples of errors in executing an abstract query.

TABLE V

| EXAMPLES OF ERRORS IN EXECUTING AN ABSTRACT QUERY |
|---|
| An abstract query fails to be converted to a concrete query |
| A concrete query fails to execute in the physical database |
| Results fail to be retrieved from the physical database |
| Results fail to be converted from the physical representation to the logical model |

Other errors may include providing an invalid input for a condition (e.g., using a comparison value of 5.4 for an integer field) and attempting to open or save an object for which the user and/or the application does not have the requisite access privileges. In one embodiment, when the diagnostic tool 121 detects an error condition, the diagnostic tool 121 extracts sufficient portions of the runtime environment of the application 120 to subsequently construct a minimal runtime environment for recreating the error condition.

In one embodiment, the diagnostic tool 121 extracts the portions of the runtime environment as follows. The diagnostic tool 121 may extract one or more configuration files and/or resource definitions that customize behavior of the application 120. Further, the diagnostic tool 121 may extract a subset of logical fields of the DAM that are used by the abstract query that produced the error. For example, if the DAM includes four thousand logical fields, a typical query may use ten logical fields. The ten logical fields may use ten additional logical fields as dependencies. In this particular example, based on the abstract query, the diagnostic tool 121 extracts twenty logical fields from the DAM. The twenty logical fields may subsequently be used to create a new DAM for troubleshooting the abstract query.

Continuing the above example, in one embodiment, the diagnostic tool 121 may also analyze the twenty logical fields to determine which physical entities to extract from the physical database. For example, assume that the twenty logical fields reference a total of eighteen unique physical fields from seven tables of the physical database. The diagnostic tool 121 may extract sufficient information about the eighteen physical fields from the seven tables to subsequently create a new physical database for troubleshooting the abstract query. The information about the physical fields may define details such as the data types, formats, and/or lengths of each physical field. For example, the diagnostic tool 121 may extract the information from executing a DESCRIBE SQL command to obtain a list of physical fields in a table and the data format of each physical field. The diagnostic tool 121 may also analyze how physical tables are joined in the DAM to extract additional information. Consequently, the diagnostic tool 121 may extract sufficient information for subsequently recreating the physical fields and/or tables accessed for the abstract query. However, the diagnostic tool 121 need not extract actual data from the physical database at this stage.

In one embodiment, the diagnostic tool 121 may also extract other parts of the runtime environment to facilitate executing the abstract query in a subsequently-created test environment. To preserve privacy of the client, the diagnostic tool 121 may encrypt some or all of the extracted parts using the password previously provided by the Level 2 DAM administrator. As an example, the diagnostic tool 121 may extract definition files for one or more data sources. The definition files specify information (e.g., user name and password) for connecting to the physical database. The diagnostic tool 121 may also extract user and role information of the Level 1 user using the application when the error occurred.

In one embodiment, the diagnostic tool 121 may extract still other parts of the runtime environment. For example, the diagnostic tool 121 may extract the abstract query that caused the error to occur. The diagnostic tool 121 may also include a graphical representation of the abstract query. The graphical representation may correspond to the abstract query as depicted in a user interface for the DAM (used by the end user in constructing the abstract query). Further, if a concrete query is generated from the abstract query, the diagnostic tool 121 may also extract the concrete query to be included in the test environment. If the abstract query generated partial results prior to the error occurring, the diagnostic tool 121 may include the all results from executing the concrete query and the partial results that were converted to the logical model. These results may also be encrypted using the password previously provided by the Level 2 DAM administrator. Further still, the diagnostic tool 121 may also extract an indication of the logged-in user at the time of the error, a date and time of the error, and any other log files associated with the runtime environment.

In other words, in one embodiment, the diagnostic tool 121 may extract information of several types. The diagnostic tool 121 may extract a first type of information that describes what is needed to recreate a miniature abstract database, a miniature physical database underlying the abstract database, and any additional runtime information such as the abstract query and the logged-in user. The diagnostic tool 121 may extract a second type of information that describes debug and runtime information that specifically describes the abstract environment—e.g., the layout of the abstract query, the concrete query, and/or any data retrieved. This information may be compared with corresponding information in the test environment to troubleshoot the error. The diagnostic tool 121 may extract a third type of information that describes how to connect and use the miniature abstract database in conjunction with the original physical database (e.g., the data source definition files). The diagnostic tool 121 may use these three types of information to create a defect entry in the defect tracking system 605.

In one embodiment, the diagnostic tool 121 may create the defect entry in the defect tracking system 605 as follows. The diagnostic tool 121 may designate the Level 1 end user as an interested party of the defect entry. The diagnostic tool 121 may designate an appropriate Level 2 DAM administrator as the owner of the defect entry. The diagnostic tool 121 may include each type of extracted information in the defect entry. The diagnostic tool 121 may also include encrypted information in the defect entry, while indicating in the defect entry that the information is encrypted and may be confidential and/or critical. The defect tracking system 605 may then notify the Level 1 end user of the error and/or the corresponding defect entry. The defect tracking system 605 may also notify the Level 2 DAM administrator of the defect entry. The Level 2 DAM may access the defect entry via a URI provided by the defect tracking system and troubleshoot the error more efficiently using the information contained in the defect entry.

While foregoing embodiments are described with reference to extracting a minimum amount of information into a defect-handling process of a client organization, other embodiments are broadly contemplated. For example, in an alternative embodiment, the diagnostic tool 121 may create a branch in a version control system to store a snapshot of the entirety of the application. A user may subsequently recreate the error in the original environment of the application.

Figure 7:
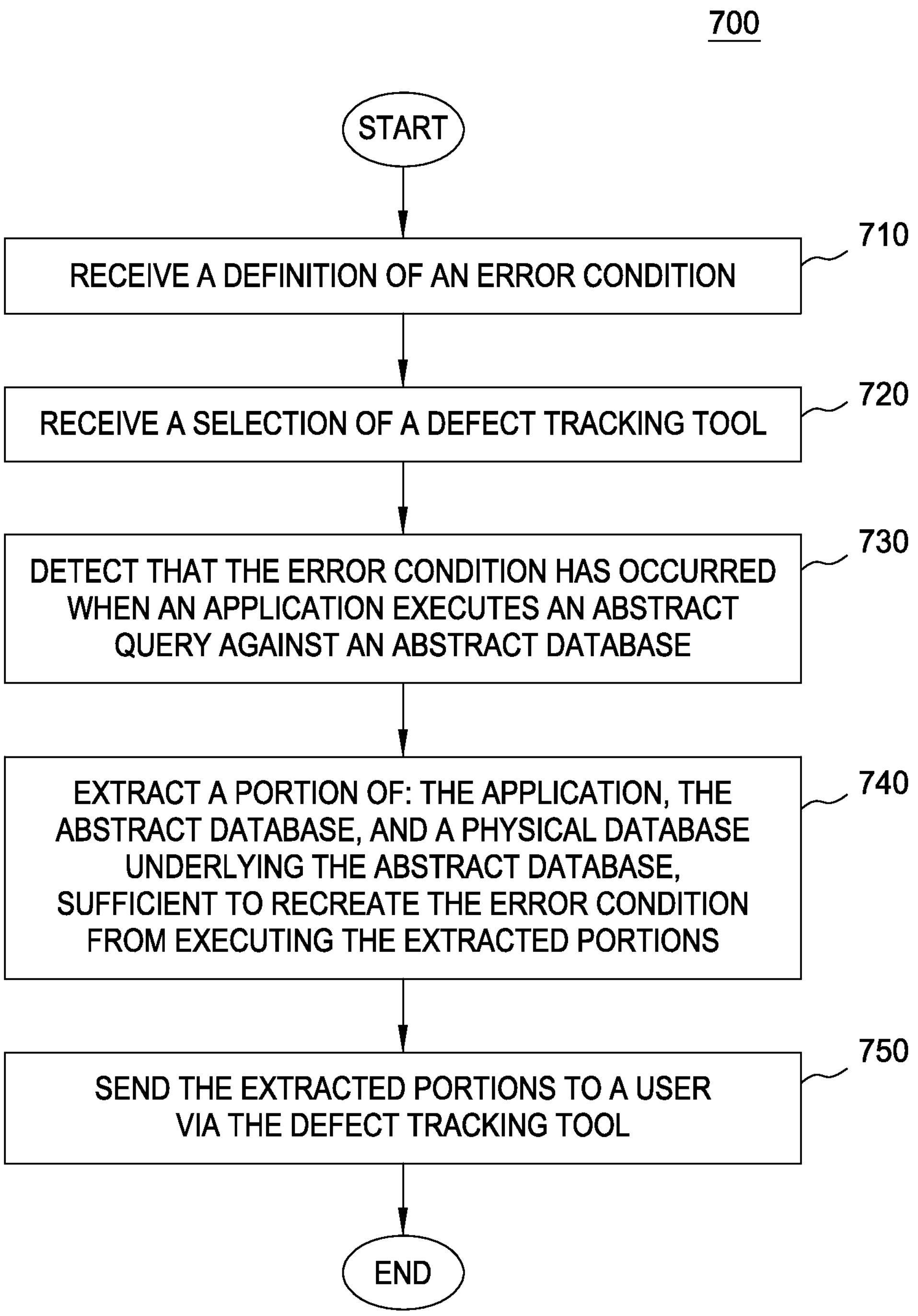
FIG. 7 is a flowchart depicting a method for extracting a runtime environment in which an error occurred in processing an abstract query, according to one embodiment of the invention.

FIG. 7 is a flowchart depicting a method 700 for extracting a runtime environment in which an error occurred in processing an abstract query, according to one embodiment of the invention. As shown, the method 700 begins at step 710, where the diagnostic tool 121 receives a definition of an error condition. At step 720, the diagnostic tool 121 receives a selection of a defect tracking tool. For example, a Level 2 DAM administrator may specify the defect tracking tool. At step 730, the diagnostic tool 121 detects that the error condition has occurred while the application executes the abstract query against an abstract database. For example, the diagnostic tool 121 may detect that the concrete query (converted from the abstract query) fails to execute against the physical database.

At step 740, the diagnostic tool 121 extracts portions of the application, the abstract database, a physical database underlying the abstract database—sufficient to recreate the error condition from subsequently executing the extracted portions. In other words, the diagnostic tool 121 may extract a miniature runtime environment to facilitate subsequent troubleshooting of the error condition. At step 750, the diagnostic tool 121 sends the extracted portions to a user via the selected defect tracking tool. For example, the Level 2 DAM administrator may be sent an email message containing a URI for accessing a new defect entry, which may include the extracted portions. After the step 750, the method 700 terminates.

Figure 8:
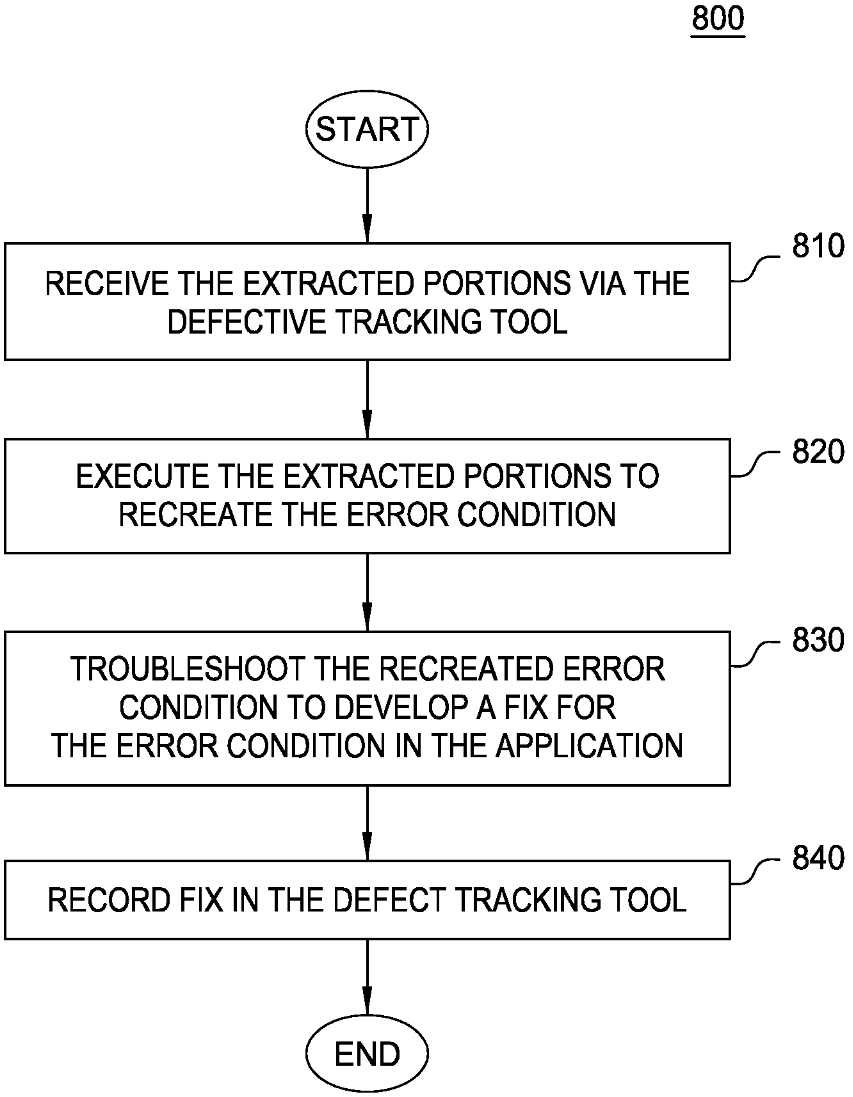
FIG. 8 is a flowchart depicting a method for recreating the error in processing the abstract query, according to one embodiment of the invention.

FIG. 8 is a flowchart depicting a method 800 for recreating the error condition, according to one embodiment of the invention. As shown, the method 800 begins at step 810, where the user receives the extracted portions via the defect tracking tool. For example, the Level 2 DAM administrator accesses the new defect entry via the URI in the email message. At step 820, the user executes the extracted portions to recreate the error condition. The Level 2 DAM administrator may more conveniently recreate the error condition using the miniature runtime environment included in the defect entry (or, alternatively, created using information included in the defect entry). At step 830, the user troubleshoots the recreated error condition to develop a fix for the error condition in the runtime environment of the application. In doing so, the user may involve additional users in troubleshooting the recreated error condition. For example, the Level 2 DAM administrator may send the URI to the defect entry to a Level 3 database administrator, a Level 4 DAM technical support specialist, and/or a Level 5 DAM developer, using the defect tracking tool. At step 840, the user records the fix in the defect tracking tool. After the step 840, the method 800 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for extracting portions of an abstract database for problem determination. One embodiment of the invention provides a diagnostic tool. The diagnostic tool may detect an error when an application executes an abstract query against the abstract database. Upon detecting the error, the diagnostic tool may extract a portion of the abstract database for problem determination. The diagnostic tool may also create a defect entry in a defect tracking tool, to store the extracted portion. The defect tracking tool may notify one or more administrative users of the defect entry. Advantageously, an administrative user may more conveniently recreate and troubleshoot the error using the extracted portion.

While the foregoing is directed to embodiments of the present invention, other and further embodiments of the invention may be devised without departing from the basic scope thereof, and the scope thereof is determined by the claims that follow.

What is claimed is:

1. A computer-implemented method to reduce storage and transmission costs associated with remote error recreation for abstract database applications, the method comprising:

upon detecting an error condition when an application executes an abstract query against an abstract database having an underlying physical database in a first computing environment, generating, by operation of one or more computer processors and not in response to any user request, an abstract database application extraction sufficient to recreate the error condition and comprising at least a portion of each of the application, the abstract database, and the physical database, respectively, wherein the portion of the abstract database includes a definition of at least one logical field used by the abstract query and excludes a definition of at least one logical field not used by the abstract query;

sending the abstract database application extraction for execution in a second computing environment different from the first computing environment; and recreating the error condition from the abstract database application extraction in order to facilitate resolving the error condition, whereby storage and transmission costs associated with recreating the error condition in the second computing environment are reduced relative to providing the entirety of each of the application, the abstract database, and the physical database, respectively, for execution in the second computing environment.

2. The computer-implemented method of claim 1, wherein the error condition is selected from at least: (i) an error in converting the abstract query to a concrete query; (ii) an error in executing the concrete query against the physical database; (iii) an error in retrieving query results from the physical database; and (iv) an error in converting the query results from the physical database to a logical representation.

3. The computer-implemented method of claim 1, further comprising:

recreating the error condition by executing the three portions; and troubleshooting the application using the recreated error condition.

4. The computer-implemented method of claim 1, wherein the method further comprises:

encrypting sensitive data in the three portions using a password specified via user input.

5. The computer-implemented method of claim 1, wherein the three portions further include the abstract query, a concrete query corresponding to the abstract query, and results obtained from executing the concrete query against the physical database.

6. The computer-implemented method of claim 1, wherein the second environment is accessible by one or more troubleshooting users, wherein the first computing environment is not accessible by the one or more troubleshooting users, wherein the error condition is recreated by the one or more troubleshooting users in the second environment in order to facilitate resolving the error condition;

wherein the first computing environment is accessible by one or more end-users different from the one or more troubleshooting users, wherein the second environment is not accessible by the one or more end-users, wherein the three portions are, upon execution, sufficient to recreate the error condition, wherein the abstract database includes the definition of the at least one logical field used by the abstract query and the definition of the at least one logical field not used by the abstract query, wherein the abstract database application extraction comprises a programmatically extracted portion, less than the entirety, of each of the application, the abstract database, and the physical database, respectively;

wherein a defect entry representing the detected error condition is created in a specified defect tracking tool without requiring user intervention, wherein the defect tracking tool is user-specified; wherein the method is performed by a diagnostic tool operatively connected to the defect tracking tool, wherein the diagnostic tool is different from the defect tracking tool, wherein the diagnostic tool is configured to facilitate troubleshooting a plurality of user errors involving a plurality of classes of users, wherein each class of users is uniquely identified by a distinct level identifier characterizing a measure of costliness of error troubleshooting involving the respective class of users, wherein a lower level identifier reflects a lower measure of costliness of error troubleshooting.

7. The computer-implemented method of claim 6, wherein the plurality of classes of users includes:

(i) end-users, having a lowest level identifier;

(ii) abstract database administrators, having a second-lowest level identifier; (iii) physical database administrators, having a third-lowest level identifier;

(iv) abstract database technical support, having a fourth-lowest level identifier; and (v) abstract database developers, having a fifth-lowest level identifier.

8. The computer-implemented method of claim 7, wherein the plurality of user errors include:

(i) a first user error characterized by the improper use of a supported abstract database configuration by an end-user;

(ii) a second user error characterized by incorrect configuration of the abstract database by an abstract database administrator;

(iii) a third user error characterized by introduction of an interfacing error between the abstract database and the physical database by at least one of an abstract database administrator and a physical database administrator;

(iv) a fourth user error characterized by presence of a defect in the physical database, that remains unfixed by the physical database administrator;

(v) a fifth user error characterized by assistance from abstraction database technical support being required by an abstract database administrator to diagnose a defect; and (vi) a sixth user error characterized by assistance from an abstract database developer being required to fix a code defect in implementation of the abstract database.

9. The computer-implemented method of claim 8, wherein the diagnostic tool is further configured to programmatically detect each error condition of:

(i) a first system error in converting the abstract query to a concrete query;

(ii) a second system error in executing the concrete query against the physical database;

(iii) a third system error in retrieving query results from the physical database; and (iv) a fourth system error in converting the query results from the physical database to a logical representation.

10. The computer-implemented method of claim 9, wherein the method further comprises:

encrypting sensitive data in the extracted three portions using a password specified via user input provided by a database abstraction model administrator, wherein the database abstraction model administrator is different from the user; and extracting environment information for the application, wherein the environment application consists of:

(i) a log file;

(ii) an indication of a logged-in user; and (iii) a date and time that the error condition is detected.

11. The computer-implemented method of claim 10, wherein the extracted portion of the application includes:

(i) the abstract query;

(ii) a concrete query corresponding to the abstract query; and (iii) results obtained from executing the concrete query against the physical database;

wherein the extracted portion of the physical database includes a definition of at least one physical field corresponding to a logical field used by the abstract query and excludes a definition of at least one physical field corresponding to a logical field not used by the abstract query.

12. A computer-readable storage medium containing a program which, when executed, performs an operation to reduce storage and transmission costs associated with remote error recreation for abstract database applications, the operation comprising:

upon detecting an error condition when an application executes an abstract query against an abstract database having an underlying physical database in a first computing environment, generating, by operation of one or more computer processors when executing the program and not in response to any user request, an abstract database application extraction sufficient to recreate the error condition and comprising at least a portion of each of the application, the abstract database, and the physical database, respectively, wherein the portion of the abstract database includes a definition of at least one logical field used by the abstract query and excludes a definition of at least one logical field not used by the abstract query;

sending the abstract database application extraction for execution in a second computing environment different from the first computing environment; and recreating the error condition from the abstract database application extraction in order to facilitate resolving the error condition, whereby storage and transmission costs associated with recreating the error condition in the second computing environment are reduced relative to providing the entirety of each of the application, the abstract database, and the physical database, respectively, for execution in the second computing environment.

13. The computer-readable storage medium of claim 12, wherein the error condition is selected from at least: (i) an error in converting the abstract query to a concrete query; (ii) an error in executing the concrete query against the physical database; (iii) an error in retrieving query results from the physical database; and (iv) an error in converting the query results from the physical database to a logical representation.

14. The computer-readable storage medium of claim 12, wherein the operation further comprises:

recreating the error condition by executing the three portions; and troubleshooting the application using the recreated error condition.

15. The computer-readable storage medium of claim 12, wherein the operation further comprises:

encrypting sensitive data in the three portions using a password specified via user input.

16. The computer-readable storage medium of claim 12, wherein the three portions further include the abstract query, a concrete query corresponding to the abstract query, and results obtained from executing the concrete query against the physical database.

17. A system to reduce storage and transmission costs associated with remote error recreation for abstract database applications, the system comprising:

one or more computer processors;

a memory containing a program which, when executed by the one or more computer processors, is configured to perform an operation comprising:

upon detecting an error condition when an application executes an abstract query against an abstract database having an underlying physical database in a first computing environment, generating, not in response to any user request, an abstract database application extraction sufficient to recreate the error condition and comprising at least a portion of each of the application, the abstract database, and the physical database, respectively, wherein the portion of the abstract database includes a definition of at least one logical field used by the abstract query and excludes a definition of at least one logical field not used by the abstract query;

sending the abstract database application extraction for execution in a second computing environment different from the first computing environment; and recreating the error condition from the abstract database application extraction in order to facilitate resolving the error condition, whereby storage and transmission costs associated with recreating the error condition in the second computing environment are reduced relative to providing the entirety of each of the application, the abstract database, and the physical database, respectively, for execution in the second computing environment.

18. The system of claim 17, wherein the error condition is selected from at least: (i) an error in converting the abstract query to a concrete query; (ii) an error in executing the concrete query against the physical database; (iii) an error in retrieving query results from the physical database; and (iv) an error in converting the query results from the physical database to a logical representation.

19. The system of claim 17, wherein the operation further comprises:

recreating the error condition by executing the three portions; and troubleshooting the application using the recreated error condition.

20. The system of claim 17, wherein the operation further comprises:

encrypting sensitive data in the three portions using a password specified via user input.

21. The system of claim 17, wherein the portion of the application includes the abstract query, wherein the portion of the abstract database includes a concrete query corresponding to the abstract query, and wherein the portion of the abstract database includes at least partial results obtained from executing the concrete query against the physical database.

* * * * *